United States Patent
Bannai et al.

(10) Patent No.: US 7,986,334 B2
(45) Date of Patent: Jul. 26, 2011

(54) IMAGE FORMING APPARATUS, OPTICAL WRITING DEVICE, AND OPTICAL WRITING METHOD

(75) Inventors: Kazunori Bannai, Atsugi (JP); Hideto Higaki, Yokohama (JP); Daisuke Imaki, Sagamihara (JP); Noboru Kusunose, Yokohama (JP); Yoshinobu Sakaue, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 493 days.

(21) Appl. No.: 12/230,987

(22) Filed: Sep. 9, 2008

(65) Prior Publication Data

US 2009/0066780 A1  Mar. 12, 2009

(30) Foreign Application Priority Data

Sep. 10, 2007  (JP) ................ 2007-234232

(51) Int. Cl.
B41J 2/47 (2006.01)
B41J 27/00 (2006.01)

(52) U.S. Cl. ........ 347/239; 347/232; 347/255; 347/244; 347/243; 347/256; 347/258; 347/259; 347/260; 347/261

(58) Field of Classification Search ............ 347/232, 347/243–244, 255–256, 258–261
See application file for complete search history.

(56) References Cited

U.S. PATENT DOCUMENTS

| | | | |
|---|---|---|---|
| 5,055,860 A | 10/1991 | Bannai | |
| 5,315,322 A | 5/1994 | Bannai | |
| 5,371,526 A * | 12/1994 | Appel et al. ............ 347/239 |
| 6,697,092 B2 | 2/2004 | Bannai | |
| 6,786,590 B2 | 9/2004 | Maki et al. | |
| 6,873,346 B2 | 3/2005 | Bannai | |
| 6,891,559 B1 | 5/2005 | Bannai | |
| 7,215,349 B2 | 5/2007 | Sakaue et al. | |
| 2003/0058324 A1 | 3/2003 | Bannai | |
| 2004/0100550 A1 | 5/2004 | Bannai et al. | |
| 2005/0174418 A1 | 8/2005 | Sakaue et al. | |
| 2006/0055769 A1 | 3/2006 | Yamazaki et al. | |
| 2007/0053040 A1 | 3/2007 | Sakaue et al. | |
| 2007/0064087 A1 | 3/2007 | Matsumae et al. | |
| 2007/0153079 A1 | 7/2007 | Sakaue et al. | |
| 2007/0164204 A1 * | 7/2007 | Shiraishi .............. 250/234 |
| 2007/0188589 A1 | 8/2007 | Kusunose et al. | |
| 2008/0024851 A1 | 1/2008 | Sakaue et al. | |

FOREIGN PATENT DOCUMENTS

| | | |
|---|---|---|
| JP | 58-079215 | 5/1983 |
| JP | 04-074688 | 3/1992 |
| JP | 05-080264 | 4/1993 |
| JP | 05080264 A * | 4/1993 |
| JP | 09-127444 | 5/1997 |
| JP | 10-003048 | 1/1998 |
| JP | 10-282440 | 10/1998 |

* cited by examiner

*Primary Examiner* — Stephen D Meier
*Assistant Examiner* — Sarah Al-Hashimi
(74) *Attorney, Agent, or Firm* — Harness, Dickey & Pierce, P.L.C.

(57) ABSTRACT

An image forming apparatus includes a plurality of image carriers and an optical writing device including light sources that emit light beams of different wavelengths, a deflector that deflects the light beams emitted from the light sources and synthesized on an identical axis in a sub-scanning direction, a first beam separator, a second beam separator, a first imaging device, and a second imaging device. The first beam separator and the second beam separator are located between the first imaging device and the second imaging device and transmit or reflect the light beams according to travel directions or wavelengths thereof. One of the targets is scanned with the light beam transmitted through the second beam separator. Another target is scanned with the light beam reflected by the second and first beam separators. The first and second imaging devices narrow the beams in the main scanning direction and the sub-scanning direction, respectively.

21 Claims, 8 Drawing Sheets

IMAGE FORMING APPARATUS, OPTICAL WRITING DEVICE, AND OPTICAL WRITING METHOD

CROSS-REFERENCE TO RELATED APPLICATION

This application claims priority to Japanese Patent Application No. 2007-234232, filed on Sep. 10, 2007, the entire contents of which are hereby incorporated by reference herein.

BACKGROUND OF THE INVENTION

1. Field of the Invention

The present invention relates to an optical writing device or an optical scanning device and an optical writing method used in an image forming apparatus such as a copier, a printer, a facsimile machine, and a multifunction machine including at least two of these functions.

2. Discussion of the Background Art

In the market for image forming apparatuses, needs have arisen to reduce the size, the weight, and the cost of the apparatus. In particular, color image forming apparatuses include more components and are larger than typical monochrome image forming apparatuses. Therefore, more compact color image forming apparatuses are highly desired.

A commercially available image forming apparatus includes an optical writing device (an optical scanning device) that scans surfaces of image carriers with multiple light beams, respectively, by reflecting each light beam multiple times by multiple reflecting mirrors. The use of multiple mirrors, however, makes the optical writing device thicker.

FIG. 1 illustrates an example of a configuration of a known optical writing device. In the optical writing device shown in FIG. 1, light beams emitted from light sources, not illustrated, are deflected by a polygon mirror 54 and then reflected by multiple mirrors (reflecting mirrors) 59 to be respectively guided to photoconductors 101, which are targets to be scanned. The mirrors 59 for guiding the light beams to the photoconductors 101 should be arranged such that the light beams do not interfere with one another. Such arrangement naturally requires a larger space. In particular, the height of the optical writing device is increased.

In order to achieve the desired compactness, several approaches are known. For example, one known technique provides an optical scanning device for a multi-color image forming apparatus that scans multiple photoconductors using two light sources whose deflection directions or wavelengths are different from each other. Another known technique provides an optical scanning device and an electrophotographic recording device that use a multi-chip semiconductor laser light source including multiple juxtaposed semiconductor laser chips that emit laser beams of different wavelengths so as to scan multiple photoconductor drums separately. Yet another known technique provides an image forming apparatus that includes a separator that directs multiple deflected laser beams in different directions to different areas of a target object in image forming operation.

In the approaches described above, light beams are synthesized and then separated by the separator. However, lengths of the optical paths from the light sources to the photoconductors may be different. Alternatively, even when the optical path lengths are equalized, a scanning surface of the polygon mirror, which is a surface formed with the light beam directed by the polygon mirror, cannot parallel a plane that connects positions of the multiple photoconductors onto which the light beams are respectively directed. (Hereinafter, the position onto which the light beam is directed is referred to as a scanned position.)

As a result, the light beams may reach on the photoconductors at different angles of incidence. Hereinafter the position onto which the light beam is directed is referred to as a scanned position.

In arrangement in which the scanning surface of the polygon mirror does not parallel the plane connecting the scanned positions on the respective photoconductors, the overall size of the optical writing device can be reduced. Still, the thickness of the optical writing device cannot be reduced because the multiple reflecting mirrors are used therein, and thus the image forming apparatus remains relatively large.

Further, in a four-color optical writing device in which optical devices are located substantially symmetrically across the polygon mirror, it is difficult to arrange the photoconductors in a line. Therefore, such an optical writing device cannot be used in a tandem color image forming apparatus, which is currently widely used.

By contrast, in other examples in which the optical path lengths from the light source to the photoconductors and the angles of incidence of the light beams on the photoconductors are different from each another, diameters of the light beams on the surfaces of the photoconductors may be different from each other as well, which is undesirable. Further, such a configuration is disadvantageous when attempting to superimpose different color images formed on the photoconductors.

SUMMARY OF THE INVENTION

In view of the foregoing, in an illustrative embodiment of the present invention, an optical writing device configured to optically scan a plurality of targets includes a plurality of light sources configured to emit light beams whose wavelengths are different from each other, a deflector configured to deflect the light beams that are emitted from the light sources and synthesized on an identical axis in a sub-scanning direction and at least one set of optical devices. The set of optical devices includes a first imaging device configured to narrow the light beams in a main scanning direction, a second imaging device configured to narrow the light beams in the sub-scanning direction, a first beam separator located between the first imaging device and the second imaging device, configured to receive the light beams deflected by the deflector and transmit or reflect the light beams according to travel directions of the light beams, and a second beam separator located between the first imaging device and the second imaging device, configured to transmit or reflect the light beams transmitted through the first beam separator according to wavelengths of the light beams and cause the light beam reflected thereon to be reflected on the first beam separator. The optical writing device is configured to scan the surface of one of the image carriers with the light beam transmitted through the second beam separator and the surface of another image carrier with the light beam reflected on the first beam separator after being reflected by the second beam separator.

In another illustrative embodiment of the present invention, an image forming apparatus includes a plurality of image carriers each of which configured to bear an image on a surface thereof and the optical writing device described above.

Yet in another illustrative embodiment of the present invention, an optical writing method of scanning a plurality of targets includes emitting light beams of different wavelengths, synthesizing the light beams on an identical axis in a sub-scanning direction, deflecting the light beams, narrowing the light beams in a main scanning direction, transmitting or reflecting the light beams according to travel directions of the light beams, transmitting or reflecting the transmitted light beams according to wavelengths of the light beams, narrowing the light beams in the sub-scanning direction, scanning a surface of one of the plurality of targets with the light beam transmitted according to the wavelength thereof, and scanning a surface of another target with the light beam reflected according to the wavelength thereof.

BRIEF DESCRIPTION OF THE DRAWINGS

A more complete appreciation of the disclosure and many of the advantages thereof will be readily obtained as the same becomes better understood by reference to the following detailed description when considered in connection with the accompanying drawings, wherein.

DETAILED DESCRIPTION OF THE INVENTION

Figure 1:
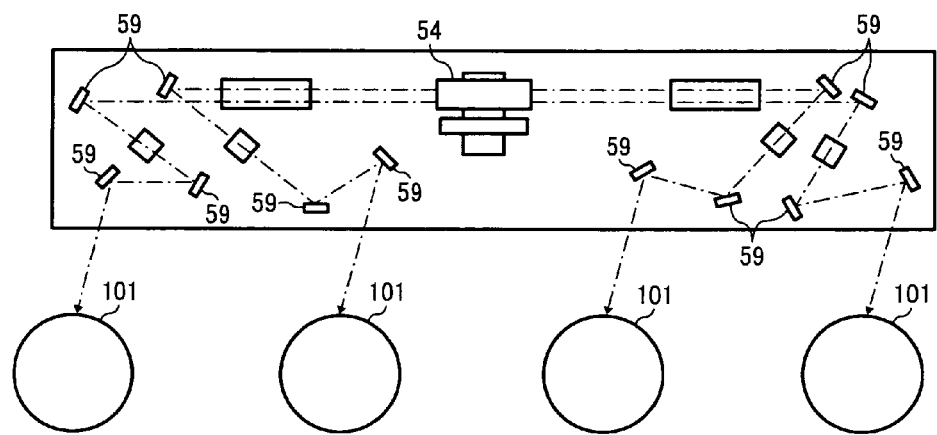
FIG. 1 illustrates an example of a configuration of a known optical writing device.

In describing preferred embodiments illustrated in the drawings, specific terminology is employed for the sake of clarity. However, the disclosure of this patent specification is not intended to be limited to the specific terminology so selected, and it is to be understood that substitutions for each specific element can include any technical equivalents that operate in a similar manner and achieve a similar result.

Referring now to the drawings, wherein like reference numerals designate identical or corresponding parts throughout the several views, particularly to FIGS. 2 to 5, an optical writing device according to an illustrative embodiment of the present invention is described.

Figure 2:
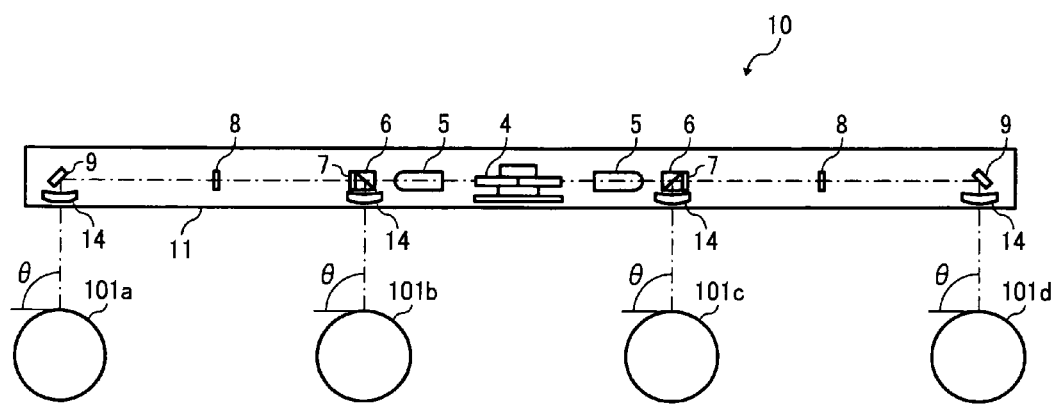
FIG. 2 is a cross-sectional view illustrating a configuration of essential parts of an illustrative embodiment of an optical writing device according to the present invention.
Figure 3:
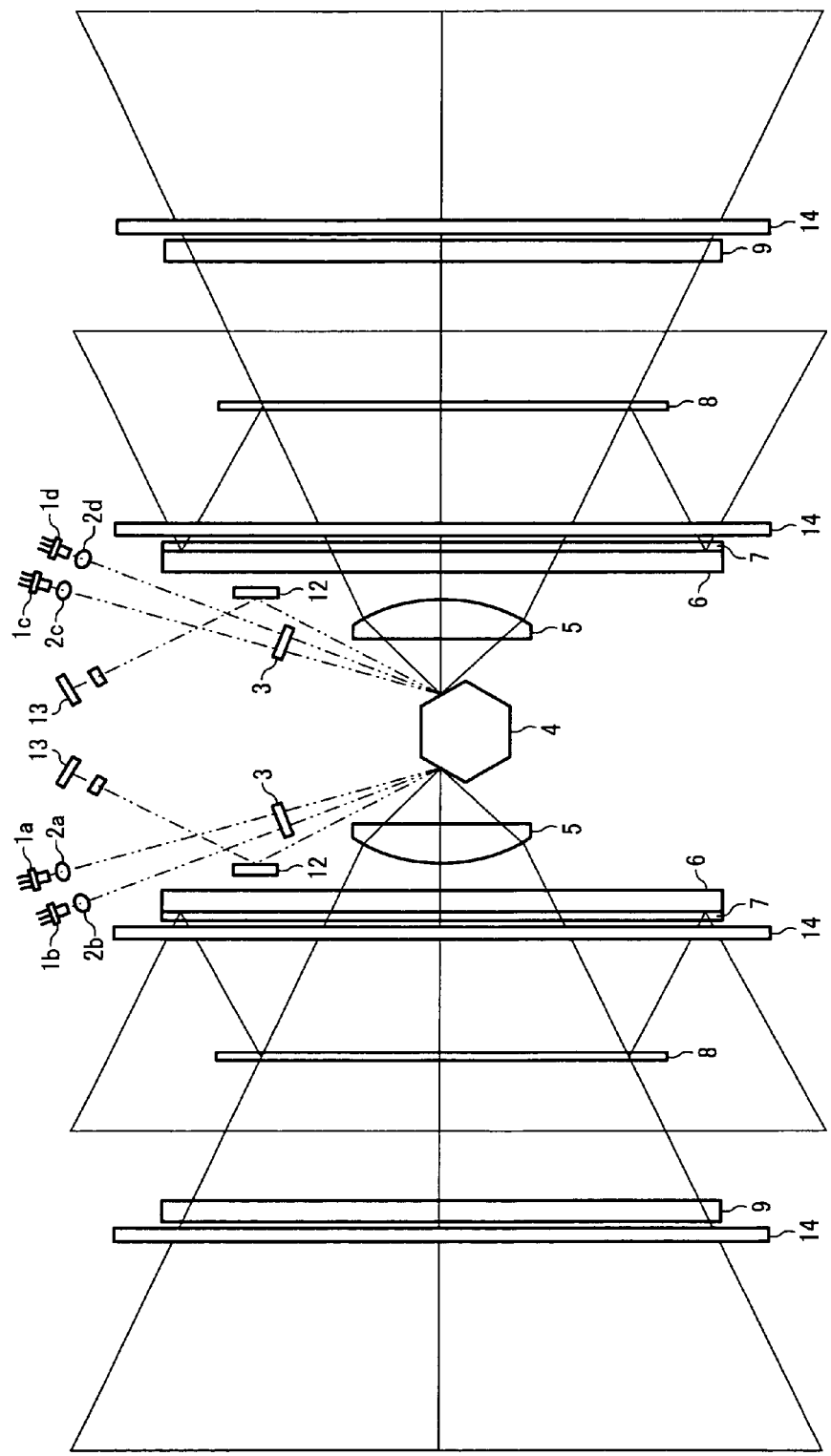
FIG. 3 is a plan view illustrating the essential parts of the optical writing device shown in FIG. 2.

FIG. 2 is a cross-sectional view illustrating a configuration of essential parts of an optical writing device 10, and FIG. 3 is a plan view thereof. The optical writing device 10 includes a polygon mirror 4 functioning as a deflection device and two sets of components located on both sides of the polygon mirror 4 in FIG. 2, that are substantially symmetrical relative to the polygon mirror 4 and share the polygon mirror 4. As illustrated in FIG. 2, four photoconductors (photoconductor drums) 101a, 101b, 101c, and 101d, which may be simply referred to as photoconductors 101 when discrimination therebetween is not necessary, are targets to be scanned by the optical writing device 10.

As shown in FIGS. 2 and 3, the optical writing device 10 includes semiconductor lasers 1a, 1b, 1c, and 1d, collimating lenses 2a, 2b, 2c, and 2d, cylindrical lenses 3, the polygon mirror 4 that is rotatable, fθ lenses 5 functioning as first imaging devices, beam deflection splitters 6 functioning as first beam separators, quarter-wave plates 7, dichroic mirrors 8 functioning as second beam separators, reflecting mirrors 9, reflecting mirrors 12, synchronization detection devices 13, lenses 14 functioning as second imaging devices, and so forth. The above components are provided in a housing 11.

It is to be noted that hereinafter the semiconductor lasers 1a, 1b, 1c, and 1d, and collimating lenses 2a, 2b, 2c, and 2d may be simply referred to as the semiconductor lens 1 and the collimating lens 2, respectively, when discrimination therebetween is not necessary.

In the optical writing device 10 according to the present embodiment, the semiconductor lasers 1a and 1b emit light beams whose wavelengths are different from each other and within a wavelength band that the corresponding dichroic mirror 8 can accommodate. Similarly, the semiconductor lasers 1c and 1d emit light beams whose wavelengths are different from each other and within a wavelength band that the corresponding dichroic mirror 8 can accommodate.

As the two sets of components disposed on both sides of the polygon mirror 4 have a similar configuration and a similar function, descriptions will be made only on the components that perform scanning operation using the semiconductor lasers 1a and 1b, located on the left in FIGS. 2 and 3, and thus descriptions of the components that perform scanning operation using the semiconductor lasers 1c and 1d, located on the right in FIGS. 2 and 3, are omitted.

The semiconductor lasers 1a and 1b, which are two different light sources, emit light beams of different wavelengths. The light beams thus emitted penetrate through the collimating lenses 2a and 2b and the cylindrical lenses 3, respectively, and then are synthesized on the identical or similar axis in a sub-scanning direction. The light beams are then reflected by the polygon mirror 4, and penetrate through the fθ lens 5 and the beam deflection splitter 6. The beam deflection splitter 6 separates the light beams in accordance with a deflection direction of the light beams based on a difference of $\pi/2$ in the rotation angle of the light beams. Thus, the beam deflection splitter 6 either transmits or reflects the light beams in accordance with travel directions of the light beams.

The two light beams of different wavelengths that have penetrated through the fθ lens 5 and the beam deflection splitter 6 further penetrate through the quarter-wave plate 7. The quarter-wave plate 7 changes the deflection directions of the light beams by an angle of $\pi/4$. Thus, the two light beams that have penetrated through the quarter-wave plate 7 travel in directions that are different by an angle of $\pi/4$ from directions in which the light sources emit the light beams, respectively. Then, one of the light beams whose travel directions are thus changed penetrates though the dichroic mirror 8, while the other light beams is reflected by the dichroic mirror 8. The dichroic mirror 8 is a dielectric multilayer film mirror provided perpendicularly to the light beams. The dichroic mirror 8 transmits a light beam within a given wavelength band and reflects a light beam within another given wavelength band. That is, the two light beams are separated into reflected light and transmitted light by the dichroic mirror 8.

The light beam that has transmitted through the dichroic mirror 8 is reflected by the reflecting mirror 9, transmitted through the corresponding lens 14 so as to be narrowed in the sub-scanning direction, and then directed to a surface of the photoconductor 101*a*. Meanwhile, the light beam reflected by the dichroic mirror 8 is transmitted back through the quarter-wave plate 7 through the identical or similar optical path. As a result, the travel direction of the light beam is again changed by an angle of $\pi/4$. That is, the direction in which the light beam travels after having transmitted back through the quarter-wave plate 7 is different by an angle of $\pi/2$ from the direction in which the light source emits that light beam. The light beam whose travel direction is thus changed is then reflected by the beam deflection splitter 6, transmitted through the corresponding lens 14 to be narrowed in the sub-scanning direction, and directed to a surface of the photoconductor 101*b*. In the above-described manner, the light beams emitted from the semiconductor lasers 1*a* and 1*b* are guided to the photoconductors 101*a* and 101*b*, respectively, to scan the photoconductors 101*a* and 101*b*.

It is to be noted that, in the present embodiment, the two light beams emitted from the semiconductor lasers 1*a* and 1*b* are both linearly deflected P-wave light beams, for example. The direction of one of the light beams is changed by an angle of $\pi/4$ by the quarter-wave plate 7, and thus that light beams is circularly deflected. The circularly deflected light beam is then transmitted through the dichroic mirror 8 and is directed to the photoconductor 101*a*. Meanwhile, the direction of the other light beam is changed by an angle of $\pi/4$ by the quarter-wave plate 7, and thus that light beam is circularly deflected. The circularly deflected light beam is then reflected by the dichroic mirror 8 and transmitted back through the quarter-wave plate 7. Thereby, the direction of that light beam is again changed by an angle of $\pi/4$, and thus that light beam is converted into a linearly deflected S-wave light beam. The linearly deflected S-wave light beam is then applied to the photoconductor 101*b*.

Also in the portion located on the right of the polygon mirror 4 in FIGS. 2 and 3, the light beams emitted from the semiconductor lasers 1*c* and 1*d* are similarly guided to the photoconductors 101*c* and 101*d*, respectively, to scan the photoconductors 101*c* and 101*d*.

The dichroic mirror 8 in the present embodiment is provided such that the optical path lengths from the light sources of the semiconductor lasers 1*a*, 1*b*, 1*c*, and 1*d* to the respective photoconductors 101*a*, 101*b*, 101*c*, and 101*d* are equal.

Further, the present embodiment is configured such that the angles of incidence of the light beams, each of which is indicated as an angle $\theta$ in FIG. 2, are equal.

It is to be noted that the light beam directed by the rotating polygon mirror 4 forms a surface (scanning surface of the polygon mirror 4) extending from the polygon mirror 4 to the reflection mirrors 9 as shown in FIG. 3, and the present embodiment is configured such that the scanning surface of the polygon mirror 4 parallels a plane connecting respective center portions of the multiple photoconductors 101*a*, 101*b*, 101*c*, and 101*d*.

Figure 4:
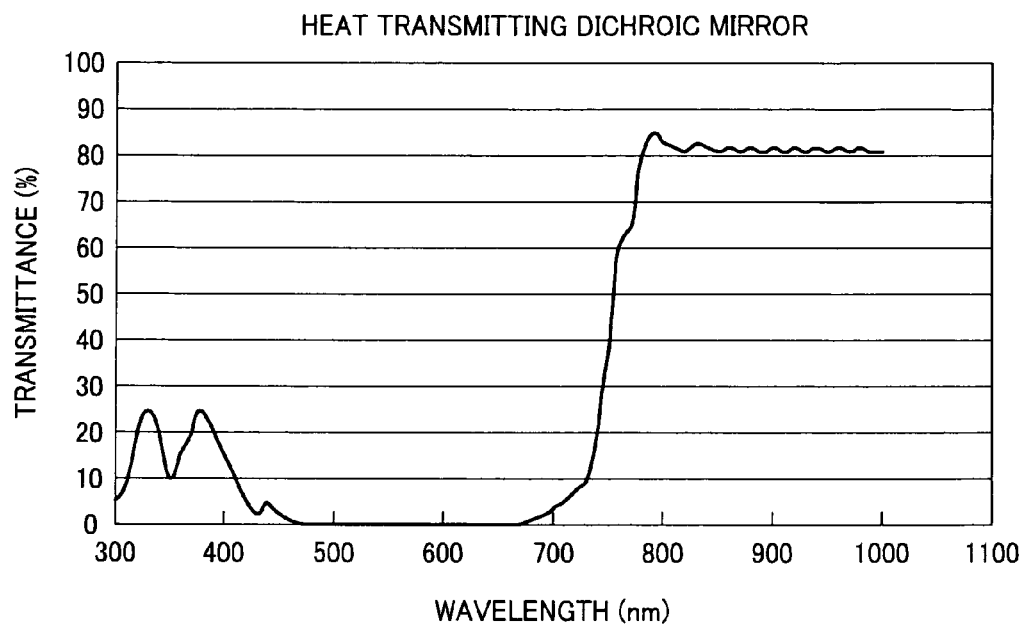
FIG. 4 is a graph illustrating an example relationship between a wavelength and a transmittance of a heat transmitting dichroic mirror.
Figure 5:
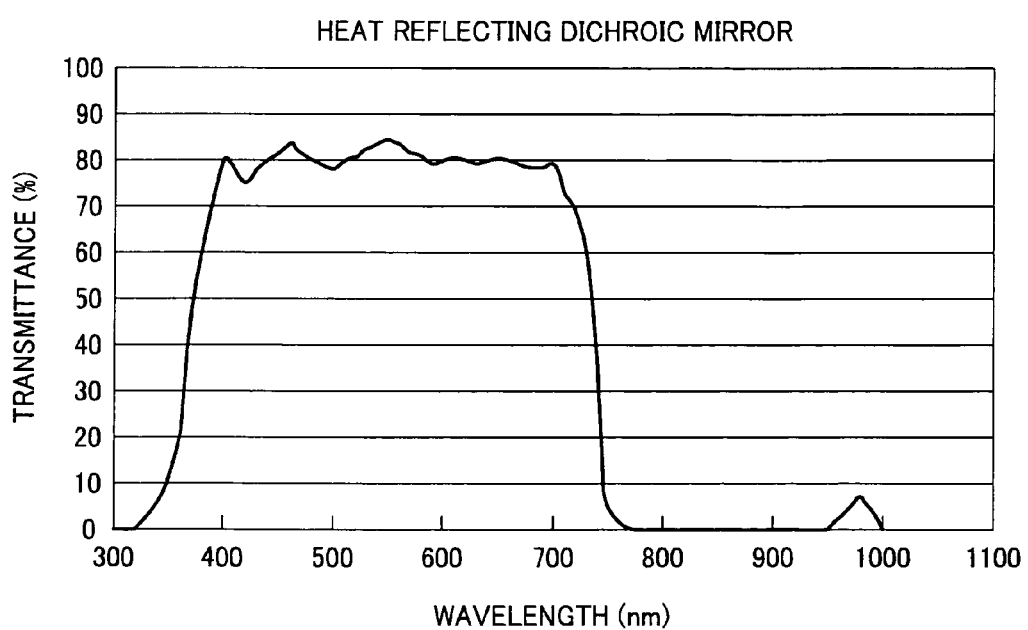
FIG. 5 is a graph illustrating an example relationship between a wavelength and a transmittance of a heat reflecting dichroic mirror.

In order to separate the two light beams using the dichroic mirror 8 that is a dielectric multilayer film mirror, the two light beams need to have different wavelengths. A wave length boundary between which the light beams are either reflected or transmitted varies depending on type of the multilayer film provided to the dichroic mirror 8. If the relationship between the wavelength and the transmittance of the dichroic mirror 8 is as illustrated in FIG. 4 or 5, the boundary is around a wavelength of approximately 750 nanometers. Therefore, the light beams respectively having wavelength bands below and above the boundary should be used.

When the dichroic mirror 8 has the wavelength-transmittance relationship illustrated in FIG. 4 or 5, visible light having a wavelength of approximately 650 nanometers and infrared light having a wavelength of approximately 800 nanometers can be selected, for example. That is, semiconductor lasers that emit the visible light having the wavelength of approximately 650 nanometers and the infrared light having the wavelength of approximately 800 nanometers, respectively, can be used as the semiconductor lasers 1*a* and 1*b*, for example.

Types of dichroic mirrors that are dielectric-multilayer film mirrors include heat reflecting type (hot mirror) and heat transmitting type (cold mirror). In the present embodiment, either of these types of mirrors can be employed. FIG. 4 illustrates the wavelength-transmittance relationship of a heat transmitting dichroic mirror, and FIG. 5 illustrates that of a heat reflecting dichroic mirror.

With reference to FIG. 3, synchronization detection performed in the optical writing device 10 is described below.

It is to be noted that, because portions of the optical writing device 10 located on the left and the right of the polygon mirror 4, which are hereinafter referred to as a left portion and a right portion of the polygon mirror 4, have a similar configuration and achieve a similar result, only the left portion of the polygon mirror 4 including the semiconductor lasers 1*a* and 1*b*, is described below, and thus a description of the right portion including the semiconductor lasers 1*c* and 1*d* is omitted.

In FIG. 3, the light beams emitted from the semiconductor lasers 1*a* and 1*b* are reflected by the polygon mirror 4, and further reflected by the reflecting mirror 12 provided outside a scanning field of the polygon mirror 4 so as to reach the synchronization detection device 13. In the present example, the synchronization detection device 13 is provided upstream from the beam deflection splitter 6 in the optical path. Therefore, the single synchronization detection device 13 can detect synchronization of the two light sources. Further, in the present configuration, the semiconductor lasers 1*a* and 1*b* are located at different angles with respect to the polygon mirror 4 and displaced from each other in the main scanning direction. Therefore, this configuration prevents simultaneous incidence of the two light beams on the synchronization detection device 13, eliminating a need to control the emission timing of the semiconductor lasers 1*a* and 1*b* for the purpose of synchronization detection. A similar description applies to the semiconductor lasers 1*c* and 1*d*.

As described above, in the optical writing device 10 according to the present embodiment, the two light beams synthesized on the identical or similar axis in the sub-scanning direction can be separated by the first and second beam separators. Therefore, the two light beams can be guided to the respective photoconductors to be scanned, without using multiple reflecting mirrors, i.e., without providing multiple reflecting mirrors at different positions in the vertical direction, unlike the known examples described with reference to FIG. 1. Further, the lenses 14 functioning as the second imaging device are provided downstream from both the reflecting mirror 9 and the beam deflection splitter 6 so that the lenses 14 can receive both the light-beam that has transmitted through the beam deflection splitter 6 and the light beam reflected thereby. Therefore, the thickness or height of the optical writing device 10 can be reduced.

Further, in the optical writing device 10 of the present embodiment, two scanning lenses, i.e., the fθ lens 5 and the lens 14 functioning as the first imaging device and the second imaging lens, respectively, are used to scan each target in order to reduce the beam diameter, improving the image quality.

It is to be noted that the fθ lens 5 located closer to the polygon mirror 4 has the fθ characteristic and narrows the light beam in the main scanning direction. By contrast, the lens 14 located farther from the polygon mirror 4 has a lens power for narrowing a light beam mainly in the sub-scanning direction. Alternatively, the lens 14 may also perform correction of the magnification error in the main scanning direction, correction of the beam diameter in the main scanning direction, etc., as well as narrowing the beam diameter in the sub-scanning direction.

The optical writing device 10 according to the present embodiment can be preferably used in a tandem full-color image forming apparatus including four image carriers on each of which a different single color image is formed. Further, the thickness of the optical writing device is not increased even in a configuration in which four light beams are separately applied to four photoconductors. Therefore, a relatively thin optical writing device can be provided. Accordingly, the optical writing device 10 according to the present embodiment is highly effective to reduce the size of the full-color image forming apparatus, particularly to reduce height of the full-color image forming apparatus.

It is to be noted that the lens 14 functioning as the second imaging device can also be used as a dustproof glass. In such a configuration, a separate dustproof glass in not necessary, reducing the number of components constituting the optical writing device 10, and thus the cost can be reduced.

Figure 6:
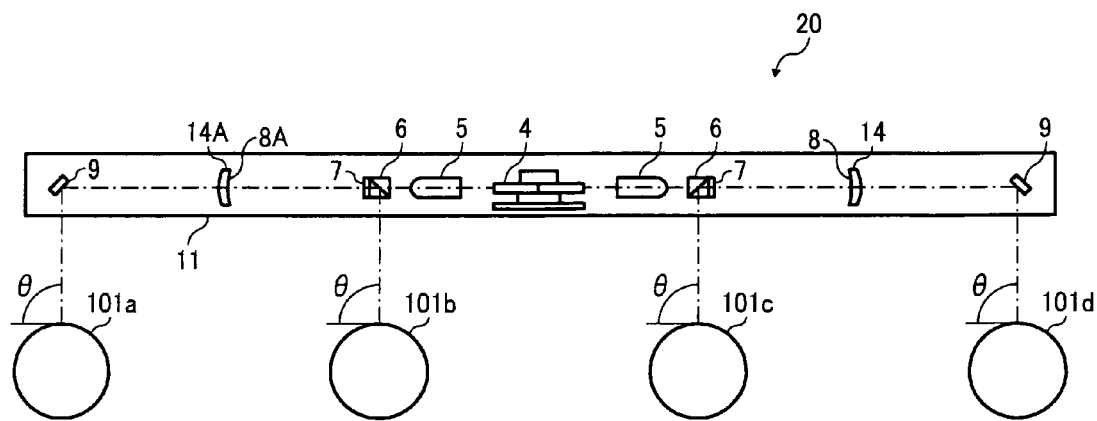
FIG. 6 illustrates a configuration of an optical writing device according to another illustrative embodiment of the present invention.
Figure 7:
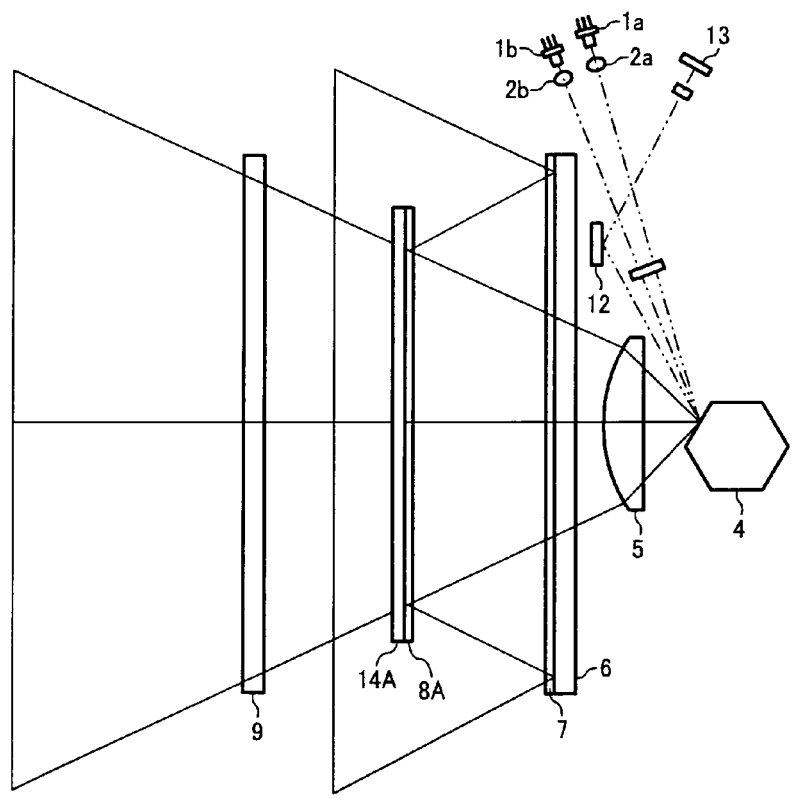
FIG. 7 is a plan view illustrating a main part of the optical writing device shown in FIG. 6.

FIG. 6 is a configuration diagram illustrating an optical writing device 20 according to another embodiment of the present invention, and FIG. 7 is a plan view illustrating a main part thereof. Similarly to the embodiment shown in FIGS. 2 and 3, two sets of components are disposed substantially symmetrically relative to a polygon mirror 4, i.e., on both sides of the polygon mirror 4. Thus, FIG. 7 illustrates only the components on the left side of the polygon mirror 4 in FIG. 6, omitting the components on the right side thereof for simplicity.

As illustrated in FIGS. 6 and 7, in the optical writing device 20 according to the present embodiment, a lens 14A functioning as a second imaging device is integrated together with a dichroic mirror functioning as a second beam separator. That is, a feature of the present embodiment is that the function of a dichroic mirror is provided on an incidence surface (beam incidence surface) 8A of the lens 14A. Except for this feature, the optical writing device 20 has a similar configuration and achieves a similar result to those of the optical writing device 10 shown in FIGS. 2 and 3, and thus a description thereof is omitted.

In the optical writing device 20 shown in FIGS. 6 and 7, due to the above-described configuration, either of the two light beams directed to the photoconductors 101a and 101b is reflected by the incidence surface 8A of the lens 14A. To narrow the light beam thus reflected in the sub-scanning direction, the incidence surface 8A of the lens 14A needs to include a concavity mirror in the sub-scanning direction.

Figure 8A:
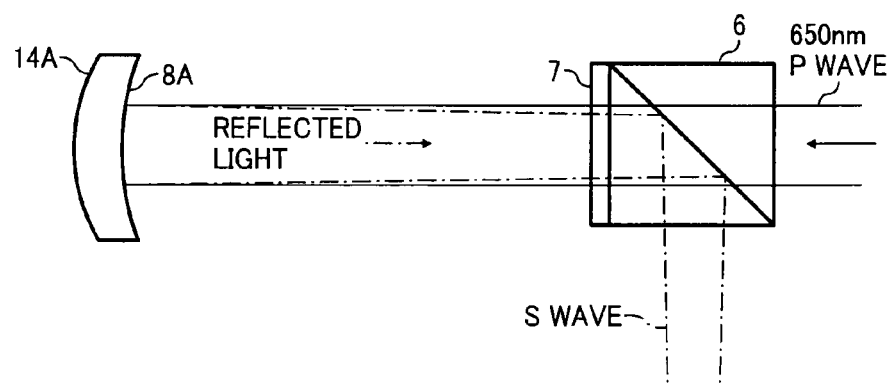
FIGS. 8A and 8B are schematic diagrams illustrating actions of another embodiment.

It is now assumed that the present example uses light beams having wavelengths of about 650 nanometers and about 780 nanometers, respectively. In this case, as illustrated in FIG. 8A, the light beam reflected by the incidence surface 8A of the lens 14A is narrowed in the sub-scanning direction and transmitted back through the quarter-wave plate 7 to be again rotated by π/4 in the deflection direction. In the present embodiment, the light beam thus rotated is converted into a linearly deflected S-wave light beam and applied to the photoconductor 101b illustrated in FIG. 6.

Figure 8B:
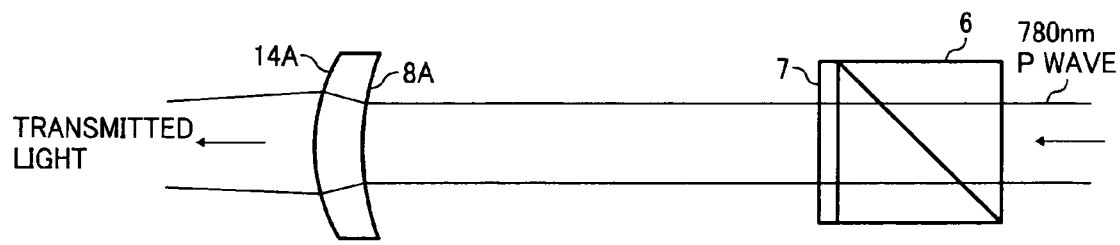

By contrast, as illustrated in FIG. 8B, the light beam transmitted through the lens 14A provided with the dichroic mirror function, i.e., the light beam directed to the photoconductor 101a is expanded by the incidence surface 8A of the lens 14A. The thus expanded light beam needs to be narrowed by the emission surface (beam emission surface) of the lens 14A. Accordingly, the emission surface of the lens 14A includes a convexity, and thus the lens 14A has a meniscus shape.

It is to be noted that different types of lenses can be used as the lens 14A. Because lens type depends on the function and the shape of the lens, brief description will be made below of the lens type that are applicable to the lens 14A.

A meniscus lens refers to a lens whose incidence surface and emission surface have a curvature in the identical or similar direction. In the embodiment shown in FIGS. 6 and 7, because the lens 14A has a meniscus shape, the lens 14A acts as a concavity mirror on the light beam reflected by a first surface, i.e., the incidence surface of the lens 14A, and thus can narrow the light beam in the sub-scanning direction. Meanwhile, the light beam transmitted through the lens 14A is expanded by the concavity incidence surface and narrowed by the convex lens forming the emission surface thereof. When the powers of the incidence surface and the emission surface are represented as $\alpha$ and $\beta$, respectively, the reflected light beam is narrowed with the power $\alpha$, and the transmitted light beam is narrowed with the power $-\alpha+\beta$. Therefore, if B is substantially similar to $2\times\alpha$ ($\beta\approx 2\times\alpha$), the reflected light beam and the transmitted light beam are narrowed with the identical or similar power, and thus have the identical or similar beam diameter.

An anamorphic lens refers to a lens whose focal distance and/or magnification level is different between two different directions that are perpendicular to the travel direction of a light beam. Therefore, when the lens 14A performs correction of the magnification error in the main scanning direction and the beam diameter in the main scanning direction, etc., an anamorphic lens is used as the lens 14A. Further, when a surface of a lens is formed into circular arc both in the main scanning direction and the sub-scanning direction, the lens is referred to as a toroidal lens. In the present embodiment, because the light beams of different wavelengths penetrate through the fθ lens 5 functioning as the first imaging device, their magnifications in the main scanning direction, their beam diameters in the main scanning direction, and so forth are different. To correct such differences with the lens 14A, therefore, the lens 14A needs to be the anamorphic lens, or the toroidal lens when the lens surfaces are circular arcs.

It is to be noted that the lens 14A is linearly illustrated in the present embodiment, since the curvature of the lens 14A for correcting the characteristics of light beams in the main scanning direction is substantially minute.

As described above, the embodiment shown in FIGS. 6 and 7 can employ either of the above-described lenses as the lens 14A as required or desired.

Further, when glass is used as a material for forming the lens 14, and dielectric multilayer film is formed on the incidence surface of the lens 14A, changes in the temperature characteristic of the lens 14 can be reduced. Alternatively, when transparent resin is used as a material for forming the lens 14, a dielectric multilayer film is formed on the incidence surface of the lens 14, and thus the cost can be reduced.

Flare light, which may affect image quality, is described below.

The two light beams transmitted through the fθ lens 5 are desired to be effectively transmitted through the beam deflection splitter 6. However, the light beams are not necessarily deflected completely perpendicularly or parallel to the beam deflection splitter 6, due to such factors as variation in emission conditions of the light sources and variation in the light sources. A light beam slightly deviated in the deflection direction is separated by the beam deflection splitter 6 and directed in a direction opposite the direction of the corresponding photoconductor 101. The light beam directed in the direction opposite the photoconductor 101 is reflected by the housing 11 shown in FIG. 6 and so forth and transmitted back through the optical path. This phenomenon may cause flare and adversely affect other photoconductors 101.

Flare light is further described below with reference to FIGS. 9A through 10B.

Figure 9A:
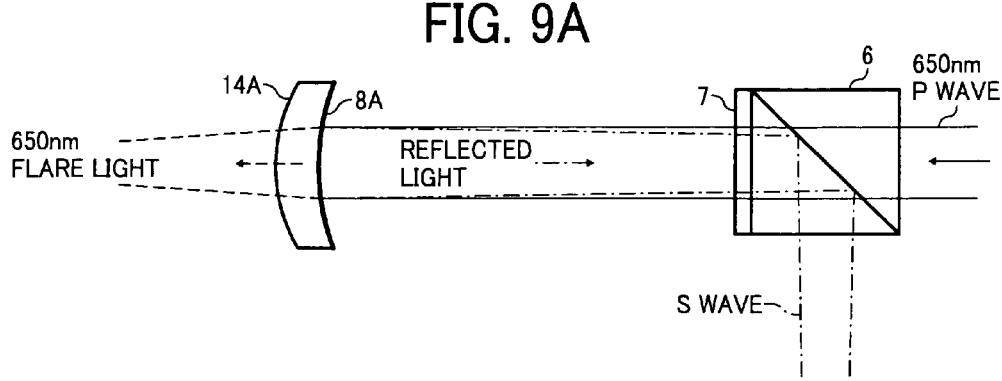
FIGS. 9A and 9B are schematic diagrams illustrating the generation of flare light and an example of a device for preventing the generation of the flare light.
Figure 10A:
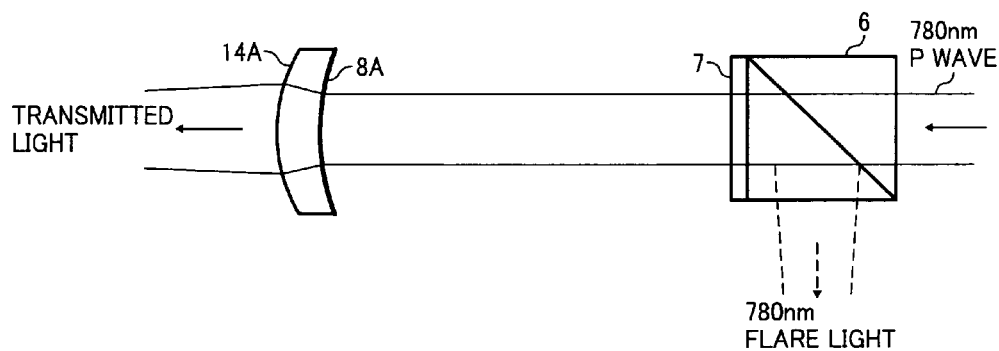
FIGS. 10A and 10B are schematic diagrams illustrating the generation of flare light and another example of the device for preventing the generation of the flare light.

As illustrated in FIG. 9A, flare light having the wavelength of approximately 650 nanometers passes through the lens 14A and travels toward the photoconductor 101a. Further, as illustrated in FIG. 10A, flare light having the wavelength of approximately 780 nanometers travels downward from the beam deflection splitter 6 toward the photoconductor 101b.

Figure 9B:
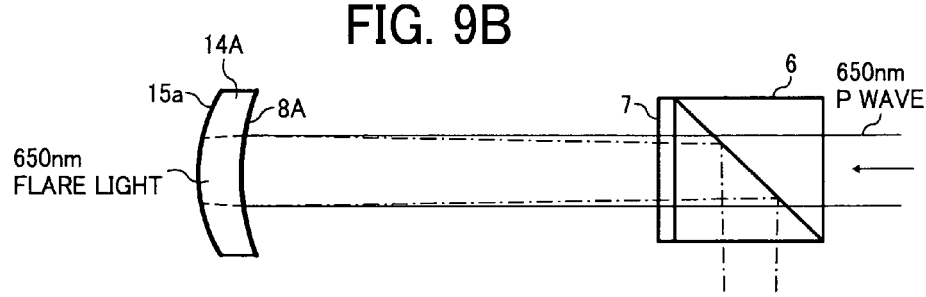
Figure 10B:
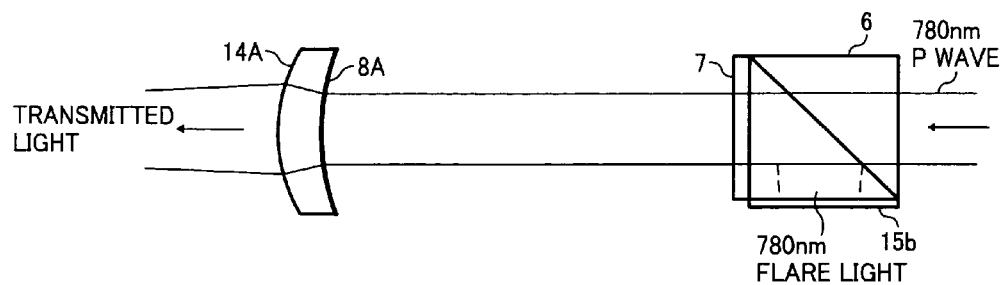

In view of the above, as illustrated in FIG. 9B, an optical filter 15a for attenuating the light beam (flare light) having the wavelength of approximately 650 nanometers is provided on the emission surface of the lens 14. Similarly, as illustrated in FIG. 10B, an optical filter 15b for attenuating the light beam (flare light) having the wavelength of approximately 780 nanometers is provided on a surface of the beam deflection splitter facing the photoconductor 101b. With such configurations, the flare light can be prevented, and a relatively high quality image can be obtained.

Because the two light beams to be separated have different wavelengths, in the configuration in which the optical path lengths of the light beams to the photoconductors 101a and 101b are equal or similar as in the embodiments described above, the beam diameters of the light beams on the surfaces of the photoconductors 101a and 101b are different from each other. In view of this, apertures are provided in front of (i.e., on the downstream side of) the collimating lenses 2a and 2b shown in FIGS. 3 and 7, and the apertures have different shapes in order to accommodate the wavelengths of the respective light beams. With this configuration, the beam diameters of the light beams on the surfaces of the photoconductors 101a and 101b can be equalized.

Figure 11:
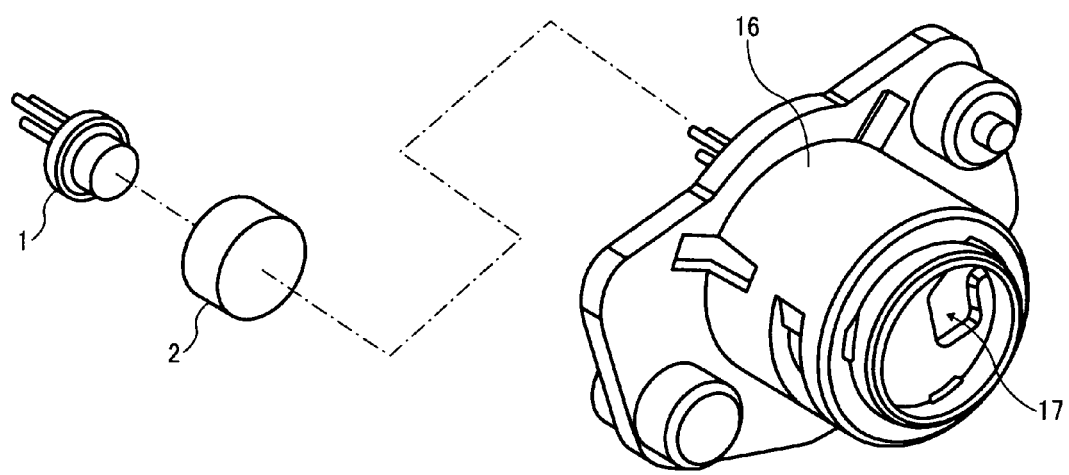
FIG. 11 is a perspective view illustrating a specific example of a configuration including a laser diode and a collimating lens in a lens holder.

FIG. 11 illustrates a specific configuration example in which the semiconductor laser (laser diode) 1 and the collimating lens 2 are provided in a lens holder 16. A light beam emitted from the semiconductor laser 1 passes through the collimating lens 2, and its beam diameter is adjusted by an aperture 17.

Description will be made below of an example of an image forming apparatus including either the optical writing device 10 shown in FIGS. 2 and 3 or the optical writing device 20 shown in FIGS. 6 and 7.

Figure 12:
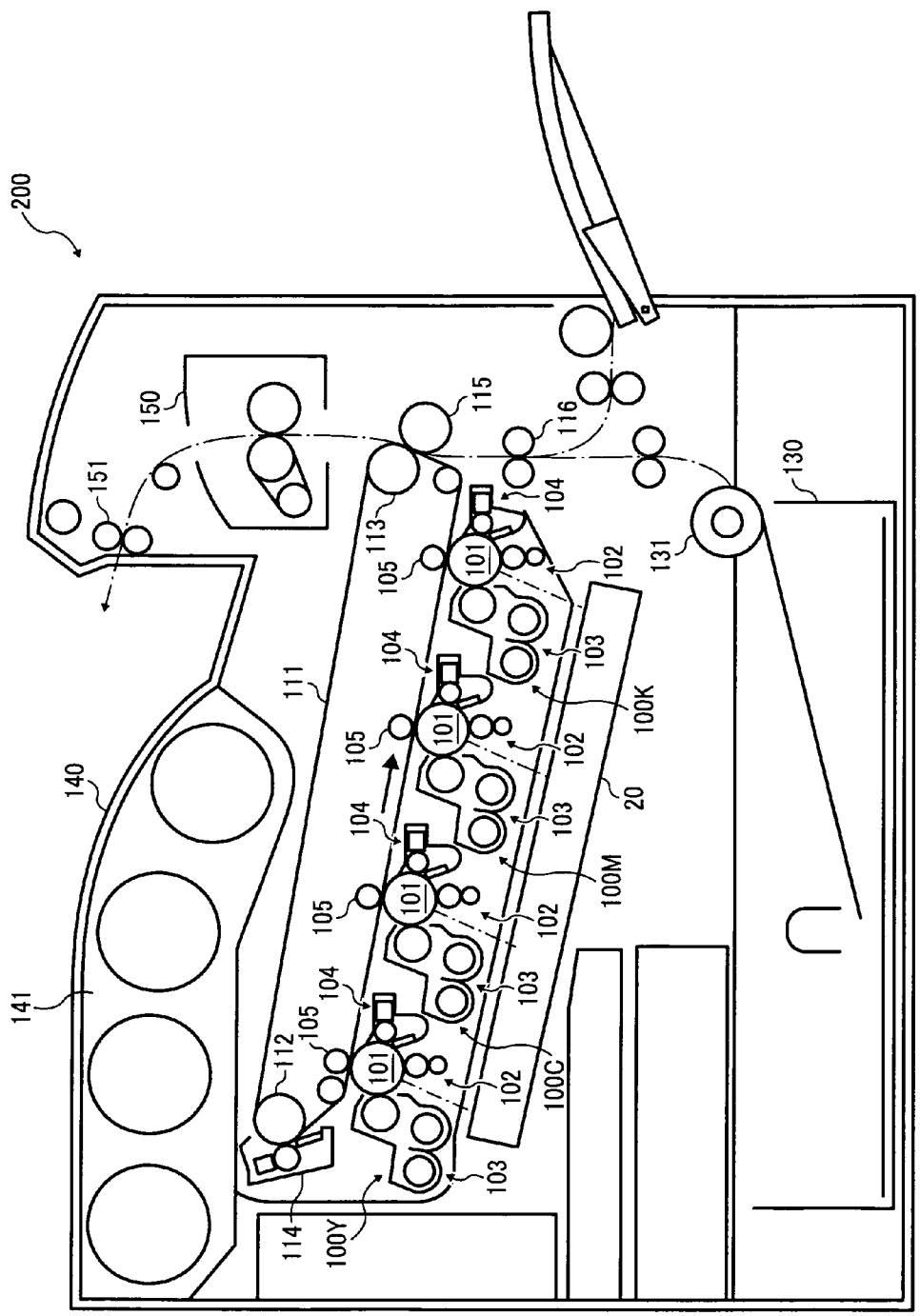
FIG. 12 is a cross-sectional configuration diagram illustrating an example of an image forming apparatus including the second embodiment of the optical writing device according to the present invention.

An image forming apparatus 200 illustrated in FIG. 12 includes the optical writing device 20 shown in FIGS. 6 and 7, four image forming units 100Y, 100C, 100M, and 100K, four photoconductors 101, an intermediate transfer belt 111, support rollers 112 and 113, a belt cleaning unit 114, a second transfer roller 115, a pair of registration rollers 116, a sheet feed cassette 130, a sheet feed device 131, a sheet discharge tray 140, a toner storage unit 141, a fixing device 150, a pair of sheet discharge rollers 151, and so forth.

The image forming apparatus is a tandem color printer and capable of forming multicolor images. In a substantial center portion of a body of the image forming apparatus 200, the image forming units 100Y, 100C, 100M, and 100K are provided. The image forming units 100Y, 100C, 100M, and 100K, which correspond to yellow, cyan, magenta, and black colors, respectively, are arranged along a lower moving side of the intermediate transfer belt 111 in FIG. 12. The intermediate transfer belt 111 looped around the support rollers 112 and 113 and so forth is driven and moved counterclockwise in FIG. 12. The belt cleaning unit 114 is provided outside the left-side support roller 112 to clean the intermediate transfer belt 111.

The image forming units 100Y, 100C, 100M, and 100K use different color toners, but configurations thereof are identical or similar. Each of the image forming units 100Y, 100C, 100M, and 100K includes the photoconductor (a photoconductor drum) 101 functioning as an image carrier. The photoconductor 101 is surrounded by a charging device 102, a development device 103, a cleaning device 104, and so forth. Further, first transfer rollers 105 functioning as the first transfer device are provided on the inner side of the intermediate transfer belt 111 to face the respective photoconductors 101.

The optical writing device 20 is provided beneath the four image forming units 100Y, 100C, 100M, and 100K. The optical writing device 20 can be used in a full-color image forming apparatus using four colors. Alternatively, the optical writing device 10 shown in FIGS. 2 and 3 can be used instead of the optical writing device 20. In the configuration of the illustrative embodiments of the present invention, the photoconductors 101a, 101b, 101c, and 101d are disposed below the optical writing device 10 or 20.

It is to be noted that, in the configuration of the present color printer, the photoconductors 101 are disposed above the optical writing device 20 to upwardly emit scanning light beams. The optical writing device 20 applies the laser beams, which have been optically modulated on the basis of image information, to the surfaces of the photoconductors 101 included in the respective image forming units 100Y, 100C, 100M, and 100K.

The toner storage unit 141 is provided above the intermediate transfer belt 111 and stores toner bottles containing yellow, cyan, magenta, and black toners. The toner is supplied by a toner supply mechanism (not illustrated) from each toner bottle to the development device 103 included each of the image forming units 100Y, 100C, 100M, and 100K.

In a lower part of the image forming apparatus 200, the sheet feed cassette 130 is provided and stores recording media such as recording sheets. Further, the sheet feed device 131 is provided to feed and convey the recording media from the sheet feed cassette 130. Detailed illustration of a sheet separation mechanism and so forth is omitted.

The second transfer roller 115 (second transfer unit) is provided to face the support roller 113 provided to the intermediate transfer belt 111. Further, the pair of registration rollers 116 is provided upstream (i.e., on the lower side in FIG. 12) of the second transfer roller 115 in the sheet conveyance direction. Further, the fixing device 150 is provided above the second transfer unit.

Brief description will be made of an image forming operation performed by the color printer configured as described above.

The photoconductors 101 of the image forming units 100Y, 100C, 100M, and 100K are driven and rotated clockwise in FIG. 12 by a driving device (not illustrated). Further, the surfaces of the photoconductors 101 are uniformly charged to a predetermined polarity by the respective charging devices 102. Then, laser beams emitted from the optical writing device 20 respectively scan the charged surfaces of the photoconductors 101 according to image information, forming electrostatic latent images thereon. In this process, image information of a full-color image to be formed is decomposed into yellow, cyan, magenta, and black image information, and each laser beam scans the surface of the corresponding photoconductor drum 101 according to the single-color image information. The electrostatic latent images thus formed are developed with respective color toners by the respective development devices 103 into visible toner images.

Further, the intermediate transfer belt 111 is driven and moved counterclockwise in FIG. 12, and the first transfer rollers 105 in the image forming units 100Y, 100C, 100M, and 100K sequentially transfer the respective toner images from the respective photoconductors 101 and superimpose one on another onto the intermediate transfer belt 111. Accordingly, the intermediate transfer belt 111 carries a full-color toner image on a surface thereof.

It is to be noted that the image forming apparatus 200 can form a single-color image using any one of the image forming units 100Y, 100C, 100M, and 100K. Similarly, a two-color image or a three-color image can also be formed. To print a monochrome image, the image forming unit 100K for block, located at the rightmost position in FIG. 12, is selected.

Residual toner adhering to the surface of each photoconductor 101 after the toner image is transferred therefrom is removed by the cleaning device 104. Then, an electricity discharge device (not illustrated) removes electricity from the surfaces of each photoconductor 101, initializing a potential thereof as preparation for a subsequent image forming operation.

Meanwhile, a recording medium is fed and conveyed from the sheet feed cassette 130 and then forwarded by the pair of registration rollers 116 to a second transfer position timely so as to overlap the toner image carried on the intermediate transfer belt 111. A predetermined transfer voltage is applied to the second transfer roller 115 so that the toner image carried on the surface of the intermediate transfer belt 111 is transferred onto the recording medium. As the recording medium onto which the toner image is transferred passes through the fixing device 150, the toner image is fused and fixed onto the recording medium by heat and pressure. Then, the recording medium on which the toner image is fixed is discharged by the pair of sheet discharge rollers 151 onto the sheet discharge tray 140 that is formed on an upper surface of the body of the image forming apparatus 200.

Because the optical writing device 20 is relatively thin, as described above, the optical writing device 20 can fit in a limited internal space of the image forming apparatus 200. Accordingly, the optical writing device 20 is effective particularly in reducing the size of a color image forming apparatus.

It is to be noted that, although the present invention has been described with reference to the illustrated examples in the description above, the present invention is not limited thereto. For example, as the light sources and the second beam separator, any device can be appropriately employed as long as the combination of the light sources and the second beam separator can separate multiple light beams. Further, the configuration of the first beam separator is not limited to that described above as long as a similar result can be available. Further, the angle of incidence of the light beams with respect to targets to be scanned can be appropriately set. Moreover, the photoconductors as the targets to be scanned are not limited to the drum-shaped photoconductors, and belt-like photoconductors can also be used.

Although the descriptions above concern the intermediate image forming apparatus, the present invention can be applied to a direct transfer image forming apparatus. Further, the present invention can also be applied to any multi-color image forming apparatus, e.g., using two different color toners, not limited to the full-color image forming apparatus using four different color toners. Further, the respective parts of the image forming apparatus can be arbitrarily configured. Needless to say, the image forming apparatus can be a copier, a facsimile machine, or a multifunction machine having multiple functions, not limited to the printer.

The above-described embodiments are illustrative and do not limit the present invention. Thus, numerous additional modifications and variations are possible in light of the above teachings. For example, elements at least one of features of different illustrative and example embodiments herein may be combined with each other at least one of substituted for each other within the scope of this disclosure and appended claims. Further, features of components of the embodiments, such as the number, the position, and the shape, are not limited the embodiments and thus may be preferably set. It is therefore to be understood that within the scope of the appended claims, the disclosure of this patent specification may be practiced otherwise than as specifically described herein.

What is claimed is:

1. An image forming apparatus comprising:
a plurality of image carriers each of which configured to bear an image on a surface thereof; and
an optical writing device configured to optically scan the surface of each of the image carriers,
the optical writing device including:
a plurality of light sources configured to emit light beams whose wavelengths are different from each other;
a deflector configured to deflect the light beams that are emitted from the light sources and synthesized on an identical axis in a sub-scanning direction;
at least one set of optical devices including a first imaging device configured to narrow the light beams in a main scanning direction, a second imaging device configured to narrow the light beams in the sub-scanning direction, a first beam separator located between the first imaging device and the second imaging device, configured to receive the light beams deflected by the deflector and transmit or reflect the light beams according to travel directions of the light beams, and a second beam separator located between the first imaging device and the second imaging device, configured to transmit or reflect the light beams transmitted through the first beam separator according to wavelengths of the light beams and cause the light beam reflected thereon to be reflected on the first beam separator,
the optical writing device configured to scan the surface of one of the image carriers with the light beam transmitted through the second beam separator and the surface of another image carrier with the light beam reflected on the first beam separator after being reflected by the second beam separator.

2. The image forming apparatus according to claim 1, configured to form a multicolor image through a tandem image forming method.

3. An optical writing device configured to optically scan a plurality of targets,
the optical writing device comprising:
a plurality of light sources configured to emit light beams whose wavelengths are different from each other;
a deflector configured to deflect the light beams that are emitted from the light sources and synthesized on an identical axis in a sub-scanning direction;
at least one set of optical devices including,
a first imaging device configured to narrow the light beams in a main scanning direction,
a second imaging device configured to narrow the light beams in the sub-scanning direction,
a first beam separator located between the first imaging device and the second imaging device, configured to receive the light beams deflected by the deflector and transmit or reflect the light beams according to travel directions of the light beams, and a second beam separator located between the first imaging device and the second imaging device, configured to transmit or reflect the light beams transmitted through the first beam separator according to wavelengths of the light beams and cause the light beam reflected thereon to be reflected on the first beam separator, the optical writing device configured to scan the surface of one of the image carriers with the light beam transmitted through the second beam separator and the surface of another image carrier with the light beam reflected on the first beam separator after being reflected by the second beam separator.

4. The optical writing device according to claim 3, wherein the second imaging device is provided within a optical path between the target and a position at which the travel direction of the light beam deflected by the deflector is changed toward the target.

5. The optical writing device according to claim 3, wherein the second beam separator and the second imaging device are integrated into a single unit.

6. The optical writing device according to claim 5, wherein the second imaging device is a meniscus shape in the sub-scanning direction.

7. The optical writing device according to claim 5, wherein the second imaging device is an anamorphic lens.

8. The optical writing device according to claim 7, wherein a beam emission surface of the second imaging device is anamorphic.

9. The optical writing device according to claim 7, wherein a beam emission surface of the second imaging device is toroidal.

10. The optical writing device according to claim 5, wherein the lens powers of a beam incidence surface and a beam emission surface of the second imaging device in the sub-scanning direction satisfy a relation $$\beta \approx 2 \times \alpha$$

wherein $\alpha$ and $\beta$ represent the powers of the beam incidence surface and the beam emission surface of the second imaging device, respectively.

11. The optical writing device according to claim 5, wherein the second imaging device comprises glass, and a dielectric multilayer film is provided on a beam incidence surface thereof.

12. The optical writing device according to claim 5, wherein the second imaging device comprises transparent resin, and a dielectric multilayer film is provided on a beam incidence surface thereof.

13. The optical writing device according to claim 5, further comprising an optical filter configured to block a light beam having a wavelength to be reflected by the second beam separator, provided on a beam emission surface of the second imaging device.

14. The optical writing device according to claim 5, further comprising an optical filter to block the light beam having a wavelength to be transmitted through the second beam separator, provided on a surface of the first beam separator facing the corresponding target.

15. The optical writing device according to claim 3, further comprising a quarter-wave plate provided between the first beam separator and the second beam separator, wherein the first beam separator is a beam deflection splitter.

16. The optical writing device according to claim 3, wherein the second beam separator is located to equalize lengths of respective optical paths from the light sources to the surfaces of the plurality of targets.

17. The optical writing device according to claim 3, wherein the light beams on the surfaces of the plurality of targets have an identical angle of incidence.

18. The optical writing device according to claim 3, wherein a scanning surface of the deflector is parallel to a plane connecting respective incident positions of the light beams incident on the respective scanned surfaces.

19. The optical writing device according to claim 3, wherein two sets of the optical devices are disposed substantially symmetrically across the deflector and share the deflector, and surfaces of four targets are respectively scanned with light beams emitted from four light sources.

20. A method of forming a multicolor image, using the image forming apparatus of claim 1.

21. A method of scanning the plurality of targets, using the optical writing device of claim 3.

* * * * *